(12) United States Patent
Itoi

(10) Patent No.: US 6,208,697 B1
(45) Date of Patent: Mar. 27, 2001

(54) CHANNEL CODE CONVERTER CAPABLE OF DECREASING DC COMPONENT AND CHANNEL CODING SYSTEM THEREFOR

(75) Inventor: Satoshi Itoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/521,782

(22) Filed: Mar. 9, 2000

(30) Foreign Application Priority Data

Mar. 10, 1999 (JP) .................................. 11-062486

(51) Int. Cl.[7] ............................. H04L 25/34; H04L 25/49
(52) U.S. Cl. ........................... 375/292; 375/259; 341/55; 341/58; 341/68
(58) Field of Search ..................... 375/292, 240, 375/259, 241; 341/9, 50, 55, 58, 68, 69

(56) References Cited

U.S. PATENT DOCUMENTS

| | | | | |
|---|---|---|---|---|
| 4,520,346 | * | 5/1985 | Shimada | 341/58 |
| 4,598,267 | * | 7/1986 | Fukuda | 341/58 |
| 5,198,813 | * | 3/1993 | Isozaki | 341/59 |
| 5,469,162 | * | 11/1995 | Chaki et al. | 341/58 |
| 5,870,040 | * | 2/1999 | Ando | 341/106 |

* cited by examiner

Primary Examiner—Chi H. Pham
Assistant Examiner—Phuong Phu
(74) Attorney, Agent, or Firm—Hayes, Soloway, Hennessey, Grossman & Hage, PC

(57) ABSTRACT

The four tables P, Q, R and S contained in an ROM 2 for 16–24 modulation have a total number of data in which the continuing bits are 2 bits, that is not larger than i bits among the 24 bits, so that the number of continuing bits having the same code is from 2 to 8 bits, so as to have the same characteristics as the (1, 7) code, and to stably lock the PLL. A comparator/selector circuit 5 selects an optimum table out of the tables P, Q, R and S.

29 Claims, 10 Drawing Sheets

| DATA BIT | CHANNEL BIT |
|----------|-------------|
| 0 0 | 0 0 x |
| 0 1 | 0 1 0 |
| 1 0 | 1 0 x |
| 1 1 0 0 | 0 0 0 0 1 0 |
| 1 1 0 1 | 0 0 0 0 0 x |
| 1 1 1 0 | 1 0 0 0 1 0 |
| 1 1 1 1 | 1 0 0 0 0 x | x : NEXT CHANNEL
BIT IS
0 THEN x = 1
1 THEN x = 0

FIG. 1
PRIOR ART

| 16 DATA BITS | 24 CHANNEL BITS | | | | NUMBER OF PATTERNS |
|---|---|---|---|---|---|
| | TABLE P | TABLE Q | TABLE R | TABLE S | |
| 0000000000000000<br>0000000000000001<br>0000000000000010<br>⋮ | A000<br>2~4         2~4<br>000011XX······XX110000 | | | | 7293 |
| | A001<br>2~4         2~4<br>000011XX······XX001111 | | | | 7341 |
| | A010<br>2~4         2~4<br>111100XX······XX110000 | | | | 7341 |
| | A011<br>2~4         2~4<br>111100XX······XX001111 | | | | 7293 |
| | A100<br>2~4         5~7<br>000011XX······XX110000000 | A101<br>2~4         5~7<br>000011XX······XX001111111 | | | 1782 |
| | A110<br>2~4         5~7<br>111100XX······XX110000000 | A111<br>2~4         5~7<br>111100XX······XX001111111 | | | 1782 |
| | A200<br>5~7         2~4<br>000000011XX······XX110000 | A211<br>5~7         2~4<br>111111100XX······XX001111 | | | 1782 |
| | A201<br>5~7         2~4<br>000000011XX······XX001111 | A210<br>5~7         2~4<br>111111100XX······XX110000 | | | 1798 |
| | A300<br>5~7<br>000000011XX··<br>··XX110000000<br>5~7 | A301<br>5~7<br>000000011XX··<br>··XX001111111<br>5~7 | A310<br>5~7<br>111111100XX··<br>··XX110000000<br>5~7 | A311<br>5~7<br>111111100XX··<br>··XX001111111<br>5~7 | 432 |

FIG. 4

| 16 DATA BITS | 24 CHANNEL BITS | | | | NUMBER OF PATTERNS |
|---|---|---|---|---|---|
| | TABLE P | TABLE Q | TABLE R | TABLE S | |
| | B000<br>1    2~4<br>011XX······XX110000 | | B011<br>1    2~4<br>100XX······XX001111 | | 5622 |
| | B001<br>1    2~4<br>011XX······XX001111 | | B010<br>1    2~4<br>100XX······XX110000 | | 5834 |
| | B100<br>1<br>011XX··<br>··XX110000000<br>5~7 | B101<br>1<br>011XX··<br>··XX001111111<br>5~7 | B110<br>1<br>100XX··<br>··XX110000000<br>5~7 | B111<br>1<br>100XX··<br>··XX001111111<br>5~7 | 1421 |
| | C000<br>2~4    1<br>000011XX······XX001 | | C001<br>2~4    1<br>000011XX······XX110 | | 5622 |
| | C010<br>2~4    1<br>111100XX······XX001 | | C011<br>2~4    1<br>111100XX······XX110 | | 5622 |
| | C100<br>5~7<br>000000011XX··<br>··XX001<br>1 | C101<br>5~7<br>000000011XX··<br>··XX110<br>1 | C110<br>5~7<br>111111100XX··<br>··XX001<br>1 | C111<br>5~7<br>111111100XX··<br>··XX110<br>1 | 1421 |
| 1111111111111100<br>1111111111111101<br>1111111111111110<br>1111111111111111 | D000<br>1<br>011XX··<br>··XX001<br>1 | D001<br>1<br>011XX··<br>··XX110<br>1 | D010<br>1<br>100XX··<br>··XX001<br>1 | D011<br>1<br>100XX··<br>··XX110<br>1 | 4150 |

FIG. 5

| 16 DATA BITS | 24 CHANNEL BITS | | | | NUMBER OF PATTERNS |
|---|---|---|---|---|---|
| | TABLE P | TABLE Q | TABLE R | TABLE S | |
| 0000000000000000<br>0000000000000001<br>0000000000000010<br>⋮ | A000<br>2~4       2~4<br>000011XX⋯⋯XX110000 | | | | 7359 |
| | A001<br>2~4       2~4<br>000011XX⋯⋯XX001111 | | | | 7341 |
| | A010<br>2~4       2~4<br>111100XX⋯⋯XX110000 | | | | 7341 |
| | A011<br>2~4       2~4<br>111100XX⋯⋯XX001111 | | | | 7359 |
| | A100<br>2~4       5~7<br>000011XX⋯⋯XX110000000 | A101<br>2~4       5~7<br>000011XX⋯⋯XX001111111 | | | 1782 |
| | A110<br>2~4       5~7<br>111100XX⋯⋯XX110000000 | A111<br>2~4       5~7<br>111100XX⋯⋯XX001111111 | | | 1782 |
| | A200<br>5~7       2~4<br>000000011XX⋯⋯XX110000 | A211<br>5~7       2~4<br>111111100XX⋯⋯XX001111 | | | 1782 |
| | A201<br>5~7       2~4<br>000000011XX⋯⋯XX001111 | A210<br>5~7       2~4<br>111111100XX⋯⋯XX110000 | | | 1798 |
| | A300<br>5~7<br>000000011XX⋯<br>⋯XX110000000<br>5~7 | A301<br>5~7<br>000000011XX⋯<br>⋯XX001111111<br>5~7 | A310<br>5~7<br>111111100XX⋯<br>⋯XX110000000<br>5~7 | A311<br>5~7<br>111111100XX⋯<br>⋯XX001111111<br>5~7 | 432 |

FIG. 7

| 16 DATA BITS | 24 CHANNEL BITS | | | | NUMBER OF PATTERNS |
|---|---|---|---|---|---|
| | TABLE P | TABLE Q | TABLE R | TABLE S | |
| | B000<br>1     2~4<br>011XX······XX110000 | | B011<br>1     2~4<br>100XX······XX001111 | | 5841 |
| | B001<br>1     2~4<br>011XX······XX001111 | | B010<br>1     2~4<br>100XX······XX110000 | | 5834 |
| | B100<br>1<br>011XX··<br>··XX110000000<br>5~7 | B101<br>1<br>011XX··<br>··XX001111111<br>5~7 | B110<br>1<br>100XX··<br>··XX110000000<br>5~7 | B111<br>1<br>100XX··<br>··XX001111111<br>5~7 | 1421 |
| | C000<br>2~4     1<br>000011XX······XX001 | | C001<br>2~4     1<br>000011XX······XX110 | | 5834 |
| | C010<br>2~4     1<br>111100XX······XX001 | | C011<br>2~4     1<br>111100XX······XX110 | | 5834 |
| | C100<br>5~7<br>000000011XX··<br>··XX001<br>1 | C101<br>5~7<br>000000011XX··<br>··XX110<br>1 | C110<br>5~7<br>111111100XX··<br>··XX001<br>1 | C111<br>5~7<br>111111100XX··<br>··XX110<br>1 | 1421 |
| ⋮<br>1111111111111100<br>1111111111111101<br>1111111111111110<br>1111111111111111 | D000<br>1<br>011XX··<br>··XX001<br>1 | D001<br>1<br>011XX··<br>··XX110<br>1 | D010<br>1<br>100XX··<br>··XX001<br>1 | D011<br>1<br>100XX··<br>··XX110<br>1 | 4589 |

FIG. 8

| 16 DATA BITS | 24 CHANNEL BITS | | | | NUMBER OF PATTERNS |
|---|---|---|---|---|---|
| | TABLE P | TABLE Q | TABLE R | TABLE S | |
| 0000000000000000<br>0000000000000001<br>0000000000000010<br>·<br>·<br>· | 2~4<br>000011XX······XX110000 | | 2~4<br>111100XX······XX001111 | | AS<br>1000 |
| | 2~4<br>000011XX······XX001111 | | 2~4<br>111100XX······XX110000 | | |
| | A000<br>2~4           2~4<br>000011XX······XX110000 | | | | 27268 |
| | A001<br>2~4           2~4<br>000011XX······XX001111 | | | | |
| | A010<br>2~4           2~4<br>111100XX······XX110000 | | | | |
| | A011<br>2~4           2~4<br>111100XX······XX001111 | | | | |
| | A100<br>2~4           5~7<br>000011XX······XX110000000 | | A101<br>2~4           5~7<br>000011XX······XX001111111 | | 1782 |
| | A110<br>2~4           5~7<br>111100XX······XX110000000 | | A111<br>2~4           5~7<br>111100XX······XX001111111 | | 1782 |
| | A200<br>5~7           2~4<br>000000011XX······XX110000 | | A211<br>5~7           2~4<br>111111100XX······XX001111 | | 1782 |
| | A201<br>5~7           2~4<br>000000011XX······XX001111 | | A210<br>5~7           2~4<br>111111100XX······XX110000 | | 1798 |
| | A300<br>5~7<br>000000011XX··<br>··XX110000000<br>5~7 | A301<br>5~7<br>000000011XX··<br>··XX001111111<br>5~7 | A310<br>5~7<br>111111100XX··<br>··XX110000000<br>5~7 | A311<br>5~7<br>111111100XX··<br>··XX001111111<br>5~7 | 432 |

FIG. 9

| 16 DATA BITS | 24 CHANNEL BITS | | | | NUMBER OF PATTERNS |
|---|---|---|---|---|---|
| | TABLE P | TABLE Q | TABLE R | TABLE S | |
| 0000000000000000<br>0000000000000001<br>0000000000000010<br>· · · | 2~4<br>000011XX······XX110000 | | 2~4<br>111100XX······XX001111 | | AS<br>2214 |
| | 2~4<br>000011XX······XX001111 | | 2~4<br>111100XX······XX110000 | | |
| | A000<br>2~4          2~4<br>000011XX······XX110000 | | | | 24972 |
| | A001<br>2~4          2~4<br>000011XX······XX001111 | | | | |
| | A010<br>2~4          2~4<br>111100XX······XX110000 | | | | |
| | A011<br>2~4          2~4<br>111100XX······XX001111 | | | | |
| | A100<br>2~4          5~7<br>000011XX······XX110000000 | | A101<br>2~4          5~7<br>000011XX······XX001111111 | | 1782 |
| | A110<br>2~4          5~7<br>111100XX······XX110000000 | | A111<br>2~4          5~7<br>111100XX······XX001111111 | | 1782 |
| | A200<br>5~7          2~4<br>000000011XX······XX110000 | | A211<br>5~7          2~4<br>111111100XX······XX001111 | | 1782 |
| | A201<br>5~7          2~4<br>000000011XX······XX001111 | | A210<br>5~7          2~4<br>111111100XX······XX110000 | | 1798 |
| | A300<br>5~7<br>000000011XX··<br>··XX110000000<br>5~7 | A301<br>5~7<br>000000011XX··<br>··XX001111111<br>5~7 | A310<br>5~7<br>111111100XX··<br>··XX110000000<br>5~7 | A311<br>5~7<br>111111100XX··<br>··XX001111111<br>5~7 | 432 |

FIG. 10

CHANNEL CODE CONVERTER CAPABLE OF DECREASING DC COMPONENT AND CHANNEL CODING SYSTEM THEREFOR

BACKGROUND OF THE INVENTION

1. Field of the Invention

The present invention relates to a channel code converter, to a channel coding system therefor, and to a recording medium recording an encoding control program. The present invention is particularly adapted to digital recording disk devices such as an optical disk device, a magnet-optic disk device, a phase-change disk device and a hard disk device, and to a digital recording VTR (video tape recorder).

2. Description of the Prior Art

In a digital recording disk device, digital data are recorded in a digital form not directly but after the data are encoded. This also applies to recording video and audio data in a digital form in the digital recording VTR. A representative example of a channel code used in encoding the data may be a (1,7) code.

FIG. 1 shows a code conversion table of the (1, 7) code. In FIG. 1, two data bits are converted into 3 channel bits, and are then recorded according to an NRZI (non-return to zero inverse) rule. FIG. 1 further illustrates an example of recording according to the NRZI rule after 4 data bits are converted into 6 channel bits. The NRZI rule is the one in which a bit is inverted with "1" and is recorded, and a bit is not inverted with "0" and is recorded.

The (1, 7) code may cause deviation in the decoded pattern due to an error at the time of recording/reproduction. By taking the return of this case into consideration, a synchronization signal is inserted every after several hundred to several thousand bits. The synchronization signal uses a channel bit pattern that does not appear in the normal data to make a clear distinction over the data.

Characteristics of the channel code are generally evaluated in terms of a minimum inversion interval Tmin, a maximum inversion interval Tmax, a detection window width Twin, and a DC (direct-current) component. It is desired that the minimum inversion interval Tmin is great and (Tmax/Tmin) is small. It is further desired that the detection window width is great and the DC component is free or is small as much as possible.

The (1, 7) code has a minimum inversion interval Tmin= 1.33T, a maximum inversion interval Tmax=5.33T, a detection window width Twin=0.67T, and the DC component which is not free. The (1, 7) code has an advantage in that the minimum inversion interval Tmin and the detection window width Twin are large, and the maximum inversion interval Tmax has a normal value. However, the (1, 7) code has a defect in that the DC component is not free. As described above, a suitable channel code is required for a recording system which requires free DC.

SUMMARY OF THE INVENTION

It is therefore an object of this invention to provide a channel code converter which increases a minimum inversion interval as large as possible, decreases (Tmax/Tmin) as small as possible, increases the detection window width as large as possible, and decreases the DC component as small as possible.

Concretely speaking, the invention provides a channel code converter in which Tmin=1.33T, Tmax=5.33T, Twin= 0.67T and which is capable of decreasing the DC component as much as possible.

Another object of this invention is to provide a channel coding system suited for the above channel code converter.

A further object of the invention is to provide a recording medium recording an encoding control program for the above channel coding system.

A channel code converter of the present invention includes a table unit for storing the combinations of channel bits of a bit number larger than a predetermined bit number assigned by the combinations of data bits of a predetermined bit number. The channel code converter converts codes of data bits of the predetermined bit number into channel bits by using the table unit and, then, records the data according to an NRZ (non-return to zero) rule.

The table unit includes a first table for storing data that satisfy predetermined conditions. The data satisfying the predetermined conditions are those data having a pattern in which the same bits are continuing by not less than 2 bits in the head portion and in the last portion among the patterns in which the same bits are necessarily continuing by not less than 2 bits except in the head portion and in the last portion of the data stored in the table unit among the channel bits, the same bits necessarily continuing by not more than k bits (k is a positive integer) except in the head portion and in the last portion, and the same bits are continuing by not more than (k−1) bits in the head portion and in the last portion. The table unit further includes a second table for storing the data of a pattern in which the head portion starts with either "01" or "10" and the same bits are continuing by not less than 2 bits in the last portion among the patterns in which the bits are continuing by not more than (k−1) bits. The table unit further includes a third table for storing the data in which the same bits are continuing by not less than 2 bits in the head portion, and the last portion ends with "01" and "10" among the patterns in which the bits are continuing by not more than (k−1) bits. The table unit further includes a fourth table for storing the data of a pattern in which the head portion starts with either "01" or "10" and the last portion ends with either "01" or "10" among the patterns in which the bits are continuing by not more than (k−1) bits.

The channel code converter further includes a selection unit for selecting any one of the first table to the fourth table so as to start with a channel bit data same as the final bit of one channel bit before and so as to end with a channel bit data same as the start bit of one channel bit after. The channel code converter so works that the continuing data bits of a data stream converted inclusive of a connection portion between the channel bits are not smaller than 2 bits but are not larger than k bits.

A channel coding system according to the present invention records the data by using the above channel code converter. The channel coding system includes a step for selecting any one of the first table to the fourth table so as to start with a channel bit data same as the final bit of one channel bit before and to end with a channel bit data same as the start bit of one channel bit after.

A recording medium according to the present invention records an encoding control program to have the channel code converter record the data. The encoding control program causes the channel code converter to select any one of the first table to the fourth table so as to start with a channel bit data same as the final bit of one channel bit before and to end with a channel bit data same as the start bit of one channel bit after. The encoding control program further so works that the continuing data bits of a data stream converted inclusive of a connection portion between the channel bits are not smaller than 2 bits but are not larger than k bits.

The channel code converter of the present invention converts 16 data bits into 24 channel bits, and record the data in the form of NRZ in an optical disk device or in the like device. In the channel code converter, the number of the continuing bits of the same code is selected to be from 2 to 8 bits to impart the same characteristics as the (1, 7) code, and the total number of data in which the continuing bits are two bits is set to be not larger than i bits (i is a positive integer) in 24 bits to select an optimum table out of the four tables to stably lock the PLL (phase-locked loop). Thus, Tmin=1.33T, Tmax=5.33T and Twin=0.67T are realized, and the DC component can be decreased as small as possible.

BRIEF DESCRIPTION OF THE DRAWINGS

FIG. 1 is a diagram illustrating a conventional (1.7) code conversion table;

FIG. 4 is a diagram of a table for converting 16 data bits into 24 channel bits according to the embodiment of the present invention;

FIG. 5 is a diagram of a table for converting 16 data bits into 24 channel bits according to the embodiment of the present invention;

FIG. 7 is a diagram of another table for converting 16 data bits into 24 channel bits according to the embodiment of the present invention;

FIG. 8 is a diagram of a further table for converting 16 data bits into 24 channel bits according to the embodiment of the present invention;

FIG. 9 is a diagram of a still further table for converting 16 data bits into 24 channel bits according to the embodiment of the present invention; and FIG. 10 is a diagram of a yet further table for converting 16 data bits into 24 channel bits according to the embodiment of the present invention.

DESCRIPTION OF THE PREFERRED EMBODIMENTS

Figure 2:
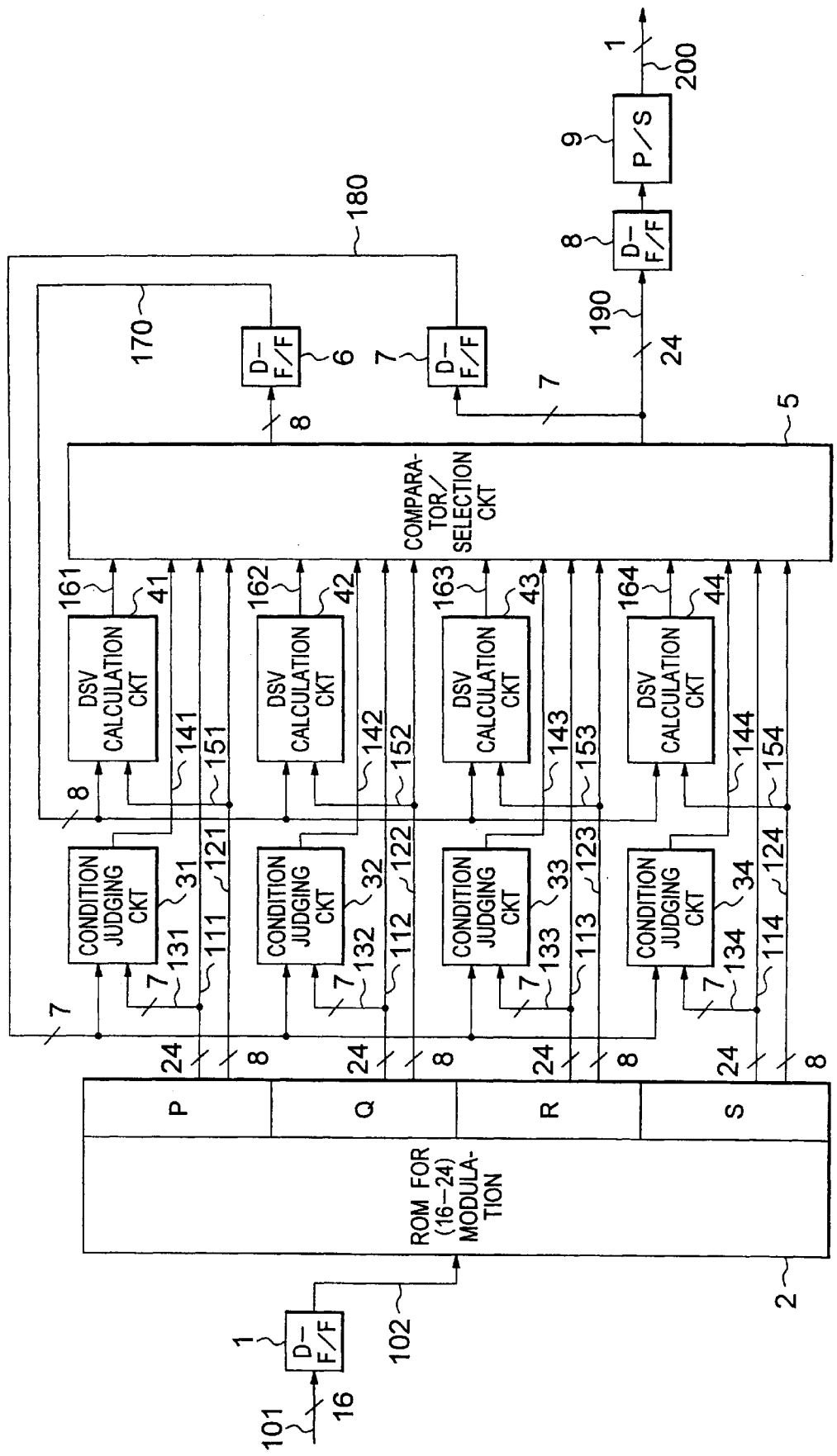
FIG. 2 is a block diagram illustrating the constitution of a code conversion circuit in a channel code converter according to an embodiment of the present invention.

A preferred embodiment of the present invention will now be described with reference to FIGS. 2 to 10. FIG. 2 is a diagram illustrating the constitution of a code conversion circuit of a channel code converter according to an embodiment of the present invention. In FIG. 2, the code conversion circuit includes D-flip/flops 1, 6, 7 and 8, a read-only memory 2 for 16–24 modulation, a comparator/selector circuit 5, a parallel/series conversion circuit 9, condition judging circuits 31, 32, 33 and 34, and digital sum variation calculation circuits 41, 42, 43 and 44. In the following description, the D-flip/flops are abbreviated as D-F/Fs, and the read-only memory is abbreviated as ROM. Further, the parallel/series conversion circuit is abbreviated as P/S, and digital sum variation is abbreviated as DSV. In FIG. 2, numerals attached to the signal lines together with inclined lines represent the numbers of bits.

Data bits 101 are supplied to the D-F/F 1 in a unit of 16 bits. The D-F/F 1 outputs data bits 102 of 16 bits (hereinafter referred to as 16 data bits) at a timing of a latch of a clock. The 16 data bits 102 are supplied to the ROM 2 for 16–24 modulation. Tables P, Q, R and S have been stored in the ROM 2 for 16–24 modulation. The ROM 2 finally selects a table out of these tables P, Q, R and S.

The table P outputs channel bit data 111 of 24 bits (hereinafter referred to as 24 channel bits) and flag data 121 of 8 bits. The flag data 121 of 8 bits comprise CDS (coded digital sum) represented by 2's complement. Similarly, the tables Q, R and S output 24 channel bits 112, 113, 114 and flag data 122, 123 and 124 of 8 bits.

Among the 24 channel bits 111, the data 131 of upper 7 bits is supplied to the condition judging circuit 31 together with data 180 of the lower 7 bits in the 24 channel bits 111 of one clock before. Data 132 of the upper 7 bits in the 24 channel bits 112 is supplied to the condition judging circuit 32 together with the data 180 of the lower 7 bits in the 24 channel bits 112 of one clock before. Similarly, data 133 of the upper 7 bits in the 24 channel bits 113 is supplied to the condition judging circuit 33 together with the data 180 of the lower 7 bits in the 24 channel bits 113 of one clock before. Data 134 of the upper 7 bits in the 24 channel bits 114 is supplied to the condition judging circuit 24 together with the data 180 of the lower 7 bits in the 24 channel bits 114 of one clock before.

The condition judging circuit 31 judges whether there exists the continuation of not more than 1 bit or the continuation of the longest continuing bit number plus more than 1 bit of the same bits at a connection point between the data 180 of the lower 7 bits of one clock before and the data 131 of the upper 7 bits corresponding to the table P. When either one is existing, the condition judging circuit 31 sets a selection inhibition flag 141 of the table P to "1". Similarly, the condition judging circuit 32 judges whether there exists the continuation of not more than 1 bit or the continuation of the longest continuing bit number plus more than 1 bit of the same bits at a connection point between the data 180 of the lower 7 bits of one clock before and the data 132 of the upper 7 bits corresponding to the table Q. When either one is existing, the condition judging circuit 32 sets a selection inhibition flag 142 of the table Q to "1". The condition judging circuit 33 judges whether there exists the continuation of not more than 1 bit or the continuation of the longest continuing bit number plus more than 1 bit of the same bits at a connection point between the data 180 of the lower 7 bits of one clock before and the data 133 of the upper 7 bits corresponding to the table R. When either one is existing, the condition judging circuit 33 sets a selection inhibition flag 143 of the table R to "1". The condition judging circuit 34 judges whether there exists the continuation of not more than 1 bit or the continuation of the longest continuing bit number plus more than 1 bit of the same bits at a connection point between the data 180 of the lower 7 bits of one clock before and the data 134 of the upper 7 bits corresponding to the table S. When either one is existing, the condition judging circuit 34 sets a selection inhibition flag 144 of the table S to "1".

Next, the flag data, i.e., CDS data 151 of 8 bits is inputted to the DSV calculation circuit 41 together with 8-bit DSV data 170 which is the flag data of 1 clock before. CDS data 152 of 8 bits is inputted to the DSV calculation circuit 42 together with the 8-bit DSV data 170 which is the flag data of 1 clock before. Similarly, CDS data 153 of 8 bits is inputted to the DSV calculation circuit 43 together with the 8-bit DSV data 170 which is the flag data of 1 clock before. CDS data 154 of 8 bits is inputted to the DSV calculation circuit 44 together with the 8-bit DSV data 170 which is the flag data of 1 clock before.

The DSV calculation circuit 41 calculates a new DSV by the addition using the 8-bit DSV data 170 of 1 clock before and the CDS data 151 corresponding to the table P of this clock (current clock). The DSV calculation circuit 41 outputs the calculated result as new DSV data 161. The DSV calculation circuit 42 calculates a new DSV by the addition using the 8-bit DSV data 170 of 1 clock before and the CDS data 152 corresponding to the table Q of this clock. The DSV calculation circuit 42 outputs the calculated result as new DSV data 162. The DSV calculation circuit 43 calculates a new DSV by the addition using the 8-bit DSV data 170 of 1 clock before and the CDS data 153 corresponding to the table R of this clock. The DSV calculation circuit 43 outputs the calculated result as new DSV data 163. The DSV calculation circuit 44 calculates a new DSV by the addition using the 8-bit DSV data 170 of 1 clock before and the CDS data 154 corresponding to the table S of this clock. The DSV calculation circuit 44 outputs the calculated result as new DSV data 164.

The comparator/selector circuit 5 receives 24 channel bits 111 to 114 corresponding to the tables P, Q, R and S, the 8-bit flag data 121 to 124, the selection inhibition flags 141 to 144, and the new DSV data 161 to 164. The comparator/selector circuit 5 does not select the table of which the selection inhibition flags 141 to 144 are "1", i.e., does not select the inhibited table. Next, the comparator/selector circuit 5 compares absolute values of the new DSV data 161 to 164 in the tables that can be selected, and finally selects a table having the smallest absolute value. The comparator/selector circuit 5 outputs 24 channel bits from the selected table as a 24-bit conversion data 190. At the same time, the comparator/selector circuit 5 outputs the lower 7 bits among the 24 channel bits as the lower 7-bit data 180 for judging the conditions of the next clock through the D-F/F 7. The comparator/selector circuit 5 further outputs the new 8-bit DSV data calculated by using the selected table as the 8-bit DSV data 170 through the D-F/F 6. The comparator/selector circuit 5 incorporates a limiter circuit (not shown) to cope with the case when the DSV exceeds the range of 8 bits.

24-bit conversion data 190 are inputted to the P/S 9 through the D-F/F 8. The P/S 9 converts the input data into serial data, and outputs the converted serial data as a bit stream 200 that has been encoded or modulated.

The processing operation of the above code conversion circuit can also be realized even by executing a program. As a medium for recording the program, there can be used a ROM or an IC (integrated circuit) memory.

Figure 3:
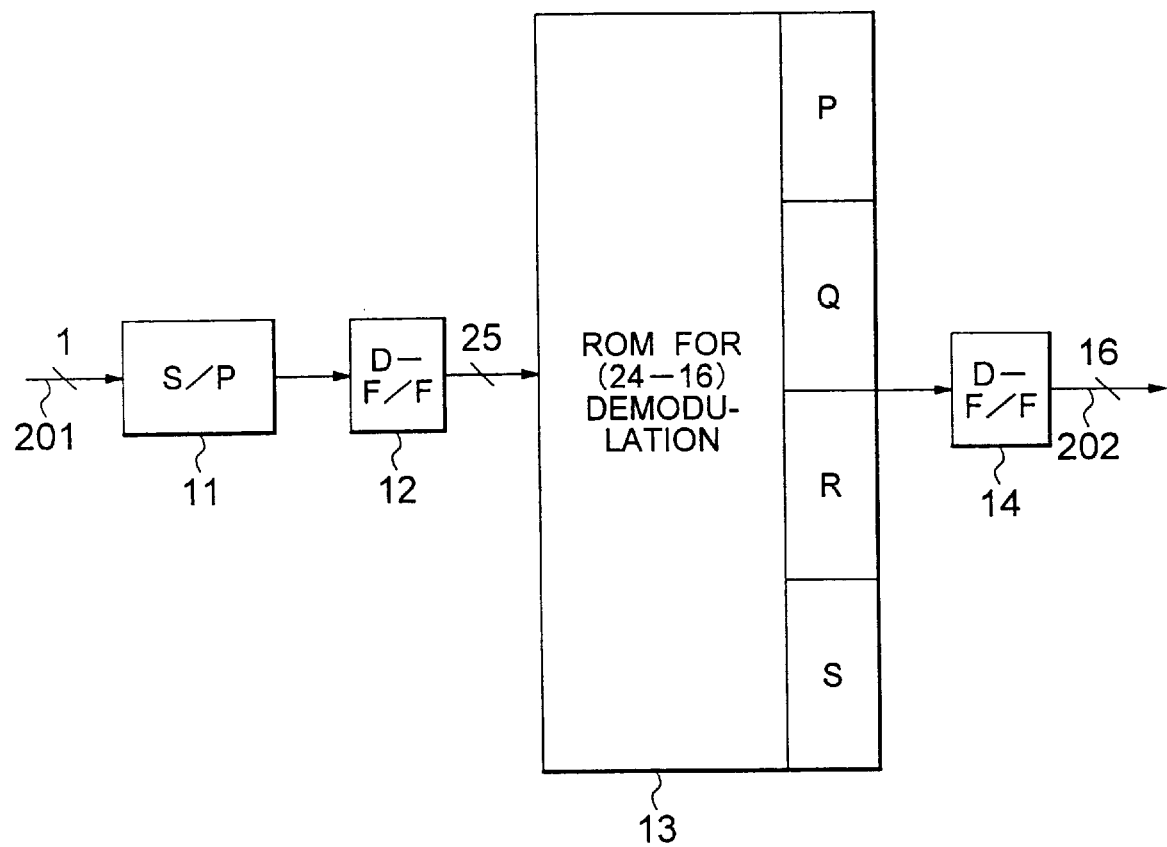
FIG. 3 is a block diagram illustrating the constitution of a code inverse-conversion circuit in the channel code converter according to the embodiment of the present invention.

FIG. 3 is a diagram illustrating the constitution of a code inverse-conversion circuit in the channel code converter according to the embodiment of the present invention. In FIG. 3, the code inverse-conversion circuit includes a series/parallel converter circuit (hereinafter abbreviated as S/P) 11, D-F/Fs 12 and 14, and an ROM 13 for 24–26 demodulation.

A modulation code 201 is converted into parallel data through the S/P 11. The converted parallel data are adjusted for their timing through the D-F/F 12. The ROM 13 for 24–26 demodulation converts the 24 channel bits into 16 data bits.

The ROM 13 for 24–26 demodulation stores the tables P, Q, R and S. The ROM 13 outputs data bits for all channel bits. The 16 data bits from the ROM 13 are delivered as data output 202 through the D-F/F 14.

The processing operation of the code inverse-conversion circuit can also be realized by executing a program. As a medium for recording the program, there can be used an ROM or an IC memory.

FIGS. 4 and 5 illustrate tables for converting 16 data bits into 24 channel bits as used in this invention. FIGS. 4 and 5 illustrate the cases where the shortest continuing bit number is 2, the longest continuing bit number k is 8, n is 4, and a maximum number of times of code conversion among the 24 channel bits is 9.

The combinations of 16 data bits include 65536 patterns. The combinations of 24 channel bits assigned from these patterns include a total of 16777216 patterns.

Among these 16777216 patterns, considered below are the combinations of data satisfying the following conditions. A first condition is that the same bits necessarily continue by not less than 2 bits except in the head portion and in the last portion of the table. A second condition is that the same bits necessarily continue by not more than 8 bits except in the head portion and in the last portion of the table, and that the bits continue by not more than 7 bits in the head portion and in the last portion of the table. A third condition is that when the 24 bits are successively arranged, a change from "0" to "1" or from "1" to "0" occurs by not more than 9 times. The combinations of data satisfying the above first to third conditions include 120014 patterns.

The above first condition is for setting the shortest continuing number of bits to be 2. The second condition is for setting the longest continuing number of bits to be 8. As for the head portion and the last portion of the table, the conditions become strict due to the connection to the preceding table or to the succeeding table. The third condition is for preventing the occurrence of PLL deviation caused by the continuation of the shortest continuing bit patterns as the code is repetitively inverted every after two bits like, for example, "00110011 - - - ". The number of times of code inversion is hereinafter referred to as inversion (abbreviated as INV).

Next, the CDS is set to be a DC level value of 24 channel bits and is defined to be a value obtained by subtracting the number of bits "L" from the number of bits "H" on the recorded data. That is, when recorded according to the NRZ rule, the channel bits "0" and "1" correspond to the recorded data "L" and "H", respectively. Therefore, the CDS assumes a value obtained by subtracting the number of "0s" from the number of "1s" in the 24 channel bits. For example, in the case of "000011000011000011000011", the CDS becomes −8. Further, the DSV is an integrated value over an extended period of CDS.

Now, the above 120014 patterns are classified into tables A0, A1, A2, A3, B0, B1, C0, C1 and D. The table A0 is a set of data in which the number of continuing bits is not smaller than 2 bits but is not larger than 4 bits in the head portion and in the last portion. There exist 29268 patterns in the set. The table A1 is a set of data in which the number of continuing bits is not smaller than 2 bits but is not larger than 4 bits in the head portion, and the number of continuing bits is not smaller than 5 bits but is not larger than 7 bits in the last portion. There exist 7160 patterns in the set. The table A2 is a set of data in which the number of continuing bits is not smaller than 5 bits but is not larger than 7 bits in the head portion, and the number of continuing bits is not smaller than 2 bits but is not larger than 4 bits in the last portion. There exist 7160 patterns in the set. The table A3 is a set of data in which the number of continuing bits is not smaller than 5 bits but is not larger than 7 bits in the head portion, and the number of continuing bits is not smaller than 5 bits but is not larger than 7 bits in the last portion. There exist 1744 patterns in the set.

The table B0 is a set of data in which the data start with "01" or "10" in the head portion and the number of continuing bits is not smaller than 2 bits but is not larger than 4 bits in the last portion. There exist 22912 patterns in the set. The table B1 is a set of data in which the data start with "01" or "10" in the head portion and the number of continuing bits is not smaller than 5 bits but is not larger than 7 bits in the last portion. There exist 5690 patterns in the set.

The table C0 is a set of data in which the number of continuing bits is not smaller than 2 bits but is not larger than 4 bits in the head portion and the data end with "01" or "10" in the last portion. There exist 22912 patterns in the set. The table C1 is a set of data in which the number of continuing bits is not smaller than 5 bits but is not larger than 7 bits in the head portion and the data end with "01" or "10" in the last portion. There exist 5690 patterns in the set.

The table D is a set of data in which the data start with "01" or "10" in the head portion and the data end with "01" or "10" in the last portion. There exist 17478 patterns in the set.

Next, the above tables A0, A1, A2, A3, B0, B1, C0, C1 and D are divided more finely. The table A0 comprises tables A00, A001, A010 and A011. The table A000 stores the data that start with "0" and ends with "0". The table A001 stores the data that start with "0" and ends with "1". The table A010 stores the data that start with "1" and ends with "0". The table A011 stores the data that start with "1" and end with "1".

The data in the table A000 are, for example, "0011110011110000001110000" and include 7293 patterns. The data of table A001 are, for example, "000011100000011110000111" and include 7341 patterns. The data of table A010 are, for example, "1111000111111000011 11000" and include 7341 patterns. The data of table A011 are, for example, "110000110000111110001111" and include 7293 patterns.

The table A1 comprises a table A100 for storing the data that start with "0" and end with "0", a table A101 for storing the data that start with "0" and end with "1", a table A110 for storing the data that start with "1" and end with "0", and a table A111 for storing the data that start with "1" and end with "1".

The data in the table A100 are, for example, "000011001111000111000 000" and include 1782 patterns. The data in the table A101 are, for example, "0001111000001100011111" and include 1798 patterns. The data in the table A110 are, for example, "11000011111100101100000000 and include 1798 patterns. The data in the table A111 are, for example, "11100110000111000111111" and include 1782 patterns.

The table A2 comprises a table A200 for storing the data that start with "0" and end with "0", a table A201 for storing the data that start with "0" and end with "1", a table A210 for storing the data that start with "1" and end with "0", and a table A211 for storing the data that start with "1" and end with "1".

The data in the table A200 are, for example, "000001111111100001110 000" and include 1782 patterns. The data in the table A201 are, for example, "00000011001100011100011" and include 1798 patterns. The data in the table A210 are, for example, "11111110011001110001100" and include 1798 patterns. The data in the table A211 are, for example, "111110000000011111 0001111" and include 1782 patterns.

The table A3 comprises a table A300 for storing the data that start with "0" and end with "0", a table A301 for storing the data that start with "0" and end with "1", a table A310 for storing the data that start with "1" and end with "0", and a table A311 for storing the data that start with "1" and end with "1".

The data in the table A300 are, for example, "000000011111000111000 000" and include 440 patterns. The data in the table A301 are, for example, "000000110011111000011111" and include 432 patterns. The data in the table A310 are, for example, "111111001100000111100000" and include 432 patterns. The data in the table A311 are, for example, "111111100000111000111111" and include 440 patterns.

The table B0 comprises a table B000 for storing the data that start with "01" and end with "0", a table B001 for storing the data that start with "01" and end with "1", a table B010 for storing the data that start with "10" and end with "0", and a table B011 for storing the data that start with "10" and end with "1".

The data in the table B000 are, for example, "011000011111100011110 000" and include 5622 patterns. The data in the table B001 are, for example, "011100110000111111100011" and include 5834 patterns. The data in the table B010 are, for example, "100011001111100000011100" and include 5834 patterns. The data in the table B011 are, for example, "100111100000011100001111" and include 5622 patterns.

The table B1 comprises a table B100 for storing the data that start with "01" and end with "0", a table B101 for storing the data that start with "01" and end with "1", a table B110 for storing the data that start with "10" and end with "0", and a table B111 for storing the data that start with "10" and end with "1".

The data in the table B100 are, for example, "011111001110000110000 000" and include 1424 patterns. The data in the table B101 are, for example, "011110001100000000111111" and include 1421 patterns. The data in the table B110 are, for example, "100001110011111111000000" and include 1421 patterns. The data in the table B111 are, for example, "100000110001111001 111111" and include 1424 patterns.

The table C0 comprises a table C000 for storing the data that start with "0" and end with "01", a table C001 for storing the data that start with "0" and end with "10", a table C010 for storing the data that start with "1" and end with "01", and a table C011 for storing the data that start with "1" and end with "10".

The data in the table C000 are, for example, "001111100011110000000" and include 5834 patterns. The data in the table C001 are, for example, "00001111100011100111110" and include 5622 patterns. The data in the table C010 are, for example, "1111000001110001100001" and include 5622 patterns. The data in the table C011 are, for example, "11000001110000111111110" and include 5834 patterns.

The table C1 comprises a table C100 for storing the data that start with "0" and end with "01", a table C101 for storing the data that start with "0" and end with "10", a table C110 for storing the data that start with "1" and end with "0" and a table C111 for storing the data that start with "1" and end with "10".

The data in the table C100 are, for example, "000001100000000111111 0 001" and include 1421 patterns. The data in the table C101 are, for example, "00000011111001100111110" and include 1424 patterns. The data in the table C111 are, for example, "111111100000011001100001" and include 1424 patterns. The data in the table C111 are, for example, "11111001111111110000 001110" and include 1421 patterns.

The table D comprises a table D000 for storing the data that start with "01" and end with "01", a table D001 for storing the data that start with "01" and end with "10", a table D010 for storing the data that start with "10" and end with "01", and a table D011 for storing the data that start with "10" and end with "10".

The data in the table D000 are, for example, "0111110001100111111100 001" and include 4589 patterns. The data in the table D001 are, for example, "0110011001111110001111110" and include 4150 patterns. The data in the table D010 are, for example, "1001100110000001110000001" and include 4150 patterns. The data in the table D011 are, for example, "1000001110011000000 011110" and include 4589 patterns.

Next, described below are patterns of 24 channel bits corresponding to 65536 patterns of 16 data bits. 24 channel bits of 4 patterns correspond to 16 data bits of one pattern, and these four patterns are represented by tables P, Q, R and S.

As for the tables A000, A001, A010 and A011, the same 24 channel bits are arranged in the tables P, Q, R and S for the 16 data bits. Therefore, 24 channel bits of "001111001111000001110000" are arranged in all tables P, Q, R and S for the 16 data bits "0000000000000000". In this case, there exist a total of 29268 patterns of the 24 channel bits.

As for the tables A100, A101, A110 and A111, 24 channel bits are arranged in a single pattern in each of the tables P, Q and R, S. In this case, the 24 channel bits are such that the head portion starts with the same data and the last portion ends with "0" and "1". That is, A100 is arranged in the tables P and Q for given 16 data bits, and A101 is arranged in the tables R and S for the same 16 data bits. Further, A110 is arranged in the tables P and Q for other 16 data bits, and A111 is arranged in the tables R and S for the same 16 data bits.

For the 16 data bits "0000000000000001", therefore, 24 channel bits "000011001111000111000000" are arranged in the tables P and Q, and 24 channel bits "000111100000110001111111" are arranged in the tables R and S. In this case, there exist a total of 3564 patterns of 24 channel bits including 1782 patterns starting with "0" and 1782 patterns starting with "1".

As for the tables A200, A201, A210 and A211, 24 channel bits are arranged in a single pattern in each of the tables P, Q and R and S. The 24 channel bits in this case are such that the head portion starts with "0" and "1". That is, A200 is arranged in the tables P and Q for given 16 data bits, and A211 or A210 is arranged in the tables R and S for the same 16 data bits. Further, A201 is arranged in the tables P and Q for other 16 data bits, and A210 or A211 is arranged in the tables R and S for the same 16 data bits.

Therefore, for example, 24 channel bits "000001111111100001110000" are arranged in the tables P and Q for the 16 data bits "0000000000000010", and 24 channel bits "111111000000011110001111" are arranged in the tables R and S. In this case, there exist a total of 3580 patterns of the 24 channel bits.

As for the tables A300, A301, A310 and A311, 24 channel bits are arranged in a single pattern in each of the tables P, Q, R and S. The 24 channel bits in this case are such that the head portion starts with "0" and "1", and the last portion ends with "0" and "1". That is, for given 16 data bits, A300 is arranged in the table P, A301 is arranged in the table Q, A310 is arranged in the table R and A311 is arranged in the table S.

Therefore, for example, 24 channel bits "000000011111000011000000" are arranged in the table P for the 16 data bits "0000000000000011". Further, 24 channel bits "000000110011111000011111" are arranged in the table Q. 24 channel bits "111111001100000111100000" are arranged in the table R. 24 channel bits "111111100000111000111111" are arranged in the table S. In this case, there exist a total of 432 patterns of the 24 channel bits.

As for the tables B000, B001, B010 and B011, 24 channel bits are arranged in a single pattern in each of the tables P, Q and R, S. The 24 channel bits in this case are such that the head portion starts with "01" and "10". That is, B000 is arranged in the tables P and Q for given 16 data bits, and B011 or B010 is arranged in the tables R and S for the same 16 data bits. Further, B001 is arranged in the tables P and Q for other 16 data bits, and B010 or B011 is arranged in the tables R and S for the same 16 data bits.

Therefore, for example, 24 data bits "001100001111110001110000" are arranged in the table P and Q for the 16 data bits "0000000000000100", and 24 channel bits "100111100000001110001111" are arranged in the tables R and S. In this case, there exist a total of 11456 patterns of the 24 channel bits.

As for the tables B100, B101, B110 and B111, 24 channel bits are arranged in a single pattern in each of the tables P, Q, R and S. The 24 channel bits in this case are such that the head portion starts with "01" and "10", and the last portion ends with "0" and "1". That is, for given 16 bits, B100 is arranged in the table P, B101 is arranged in the table Q, B110 is arranged in the table R, and B111 is arranged in the table S.

Therefore, for the 16 data bits "0000000000000101", for example, 24 channel bits "011111001110000110000000" are arranged in the table P, and 24 channel bits "011110001100000000111111" are arranged in the table Q. Further, 24 channel bits "100001110011111111000000" are arranged in the table R and 24 channel bits "100000110001111001111111" are arranged in the table S. In this case, there exist a total of 1421 patterns of the 24 channel bits.

As for the tables C000, C001, C010 and C011, 24 channel bits are arranged in a single pattern in each of the tables P, Q and R, S. The 24 channel bits in this case are such that the head portion starts with the same data and the last portion ends with "01" and "10". That is, C000 is arranged in the tables P and Q for given 16 data bits, and C001 is arranged in the tables R and S for the same 16 data bits. Further, C010 is arranged in the tables P and Q for other 16 data bits, and C011 is arranged in the tables R and S for the same 16 data bits.

Therefore, for example, 24 channel bits "001111000111100000001" are arranged in the tables P and Q for the 16 data bits "0000000000001000", and 24 channel bits "000011111000111001110" are arranged in the tables R and S. In this case, there exist a total of 11244 patterns of the 24 channel bits including 5622 patterns starting with "0" and 5622 patterns starting with "1".

As for the tables C100, C101, C110 and C111, 24 channel bits are arranged in a single pattern in each of the tables P, Q, R and S. The 24 channel bits in this case are such that the head portion starts with "0" and "1", and the last portion ends with "01" and "10". That is, for given 16 data bits, C100 is arranged in the table P, C101 is arranged in the table Q, C110 is arranged in the table R and C111 is arranged in the table S.

Therefore, for example, 24 channel bits "000001100000001111110001" are arranged in the table P for the 16 data bits "0000000000001001", and 24 channel bits "000000011111001100111110" are arranged in the table Q. Further, 24 channel bits "111111100000011001100001" are arranged in the table R, and 24 channel bits "111110011111110000001110" are arranged in the table S. In this case, there exist a total of 1421 patterns of the 24 channel bits.

As for the tables D000, D001, D010 and D011, 24 channel bits are arranged in a single pattern in each of the tables P, Q, R and S. The 24 channel bits in this case are such that the head portion starts with "01" and "10", and the last portion ends with "01" and "10". That is, for given 16 data bits, D000 is arranged in the table P, D001 is arranged in the table Q, D010 is arranged in the table R, and D011 is arranged in the table S.

Therefore, for example, 24 channel bits "011111000110011111100001" are arranged in the table P for the 16 data bits "0000000000001100", and 24 channel bits "011001100111111001111110" are arranged in the table Q. Further, 24 channel bits "100110011000001110000001" are arranged in the table R, and 24 channel bits "100000111001100000011110" are arranged in the table S. In this case, there exist a total of 4150 patterns of the 24 channel bits.

If the above patterns are added up, the result is 66536 patterns, which is larger than a minimum required value of 65536 patterns. Among the above 66536 patterns, therefore, 65536 patterns are used, but the remaining 1000 patterns are not used but are held.

Upon selecting the above tables P, Q, R and S in an optimum fashion, there can be realized the shortest continuing number of bits: 2, the longest continuing number of bits k: 8, and a maximum number of times of code change among the 24 channel bits: 9.

Next, described below is the method of selecting tables. As for the tables A000, A001, A010 and A011, the same 24 channel bits are arranged in the tables P, Q, R and S, and there is no room for selection. In this case, the table P is selected.

As for the tables A100, A101, A110 and A111, there exists the following probability when the succeeding table is table A0 (A000, A001, A010, A011), A1 (A100, A101, A110, A111), or C0 (C000, C001, C010, C01). That is, when the data ends with a bit same as the head bit of the next table, the number of continuing bits of "0" or "1" may become a maximum of 11 bits exceeding 8 bits. In this case, a table is selected with which the data ends with a bit different from the head bit of the next table.

That is, when the head bit of the next table is "1" (table A010, A011, A110, A111, C010, C011), the table P in which the tables A100 and A110 are arranged is selected. On the other hand, when the head bit of the next table is "0" (tables A000, A001, A100, A101, C000, C001), the table R in which the tables A101 and A111 are arranged is selected. In other cases, the tables are freely selected.

As for the tables A200, A201, A210 and A211, there exists the following probability when the preceding table is table A0, A1 or A2 (A200, A201, A210, A211), A3 (A300, A301, A310, A311), B0 (B000, B001, B010, B011) or B1 (B100, B101, B110, B111). That is, when the data start with a bit same as the final bit of the preceding table, the number of continuing bits of "0" or "1" may become a maximum of 14 bits exceeding 8 bits. In this case, a table is selected with which the data start with a bit different from the final bit of the preceding table.

That is, when the final bit of the preceding table is "1" (tables A001, A011, A101, A111, A201, A211, A301, A311, B001, B011, B101, B111), the table P in which the tables A200 and A201 are arranged is selected. On the other hand, when the final bit of the preceding table is "0" (tables A000, A010, A100, A110, A200, A210, A300, A310, B000, B010, B100, B110), the table R in which the tables A210 and A211 are arranged is selected.

When the preceding table is C0, C1 (C100, C101, C110, C111) or D (D000, D001, D010, D011), there exists the following probability. That is, when the data start with a bit different from the final bit of the preceding table, the number of continuing bits of "0" or "1" becomes 1 bit. In this case, the data which start with a bit same as the final bit of the preceding table are selected.

That is, when the final bit of the preceding table is "10" (tables C001, C011, C101, C111, D001, D011), the table P in which the tables A200 and A201 are arranged is selected. On the other hand, when the final bit of the preceding table is "01" (tables C000, C010, C100, C110, D000, D010), the table R in which the tables A210 and A211 are arranged is selected.

As for the tables A300, A301, A310 and A311, there exists the following probability when the preceding table is A0, A1, A2, A3, B0 or B1. That is, when the data start with a bit same as the final bit of the preceding table, the number of continuing bits of "0" or "1" may become a maximum of 14 bits exceeding 8 bits. In this case, the data are selected starting with a bit different from the final bit of the preceding table. When the next table is A0, A1 or C0, further, and the data end with a bit same as the head bit of the next table, the number of continuing bits of "0" or "1" may become a maximum of 11 bits exceeding 8 bits. In this case, a table which ends with a bit different from the head bit of the next table is selected.

That is, the table P in which the table A300 is arranged is selected when the final bit of the preceding table is "1" (tables A001, A011, A101, A111, A201, A211, A301, A311, B001, B011, B101, B111) and when the head bit of the next table is "1" (tables A010, A011, A110, A111, C010, C011). When the head bit of the next table is "0" (tables A000, A001, A100, A101, C000, C001), on the other hand, the table Q in which the table A301 is arranged is selected. The table R in which the table A310 is arranged is selected when the final bit of the preceding table is "0" (tables A000, A010, A100, A110, A200, A210, A300, A310, B000, B010, B100, B110) and when the head bit of the next table is "1" (tables A010, A011, A110, A111, C010, C011).

Further, when the head bit of the next table is "0" (tables A000, A001, A100, A101, C000, C001), the table S in which the table A311 is arranged is selected.

On the other hand, when the preceding table is C0, C1 or D and the data start with a bit different from the final bit of the preceding table, the number of continuing bits of "0" or "1" becomes 1 bit. In this case, the data are selected starting with a bit same as the final bit of the preceding table. When the succeeding table is A0, A1 or C0 and the data end with a bit same as the head bit of the next table, the number of continuing bits of "0" or "1" may become a maximum of 11 bits exceeding 8 bits. In this case, the table is selected starting with a bit different from the head bit of the next table.

That is, the table P in which the table A300 is arranged is selected when the final bit of the preceding table is "10" (tables C001, C011, C101, C111, D001, D011) and when the head bit of the next table is "1" (tables A010, A011, A110, A111, C010, C011). Further, when the head bit of the next table is "0" (tables A000, A001, A100, A101, C000, C001), the table Q in which the table A301 is arranged is selected.

The table R in which the table A310 is arranged is selected when the final bit of the preceding table is "01" (tables C000, C010, C100, C110, D000, D010) and when the head bit of the next table is "1" (tables A010, A011, A110, A111, C010, C011). Further, when the head bit of the next table is "0" (tables A000, A001, A100, A101, C000, C001), the table S in which the table A311 is arranged is selected. In other cases, the tables are freely selected.

As for the tables B000, B001, B010 and B011, when the preceding table is A0, A1, A2, A3, B0, B1, C0, C1 or D and the data start with a bit different from the final bit of the preceding table, the number of continuing bits of "0" or "1" becomes 1 bit. In this case, the data are selected starting with a bit same as the final bit of the preceding table.

That is, when the final bit of the preceding table is "0" (tables A000, A010, A100, A110, A200, A210, A300, A310, B000, B010, B100, B110, C001, C011, C101, C111, D001, D011), the table P in which the tables B000 and B001 are arranged is selected. On the other hand, when the final bit of the preceding table is "1" (tables A001, A011, A101, A111, A201, A211, A301, A311, B001, B011, B101, B111, C000, C010, C100, C110, D000, D010), the table R in which the tables B010 and B011 are arranged is selected.

As for the tables B100, B101, B110 and B111, when the preceding table is A0, A1, A2, A3, B0, B1, C0, C1 or D and the data start with a bit different from the final bit of the preceding table, the number of continuing bits of "0" or "1" becomes 1 bit. In this case, the data are selected starting with a bit same as the final bit of the preceding table. When the succeeding table is A0, A1 or C0 and the data end with a bit same as the head bit of the succeeding table, the number of continuing bits of "0" or "1" may become a maximum of 11 bits exceeding 8 bits. In this case, the table is selected ending with a bit different from the head bit of the succeeding table.

That is, the table P in which the table B100 is arranged is selected when the final bit of the preceding table is "0" (tables A000, A010, A100, A110, A200, A210, A300, A310, B000, B010, B100, B110, C001, C011, C101, C111, D001, D011) and when the head bit of the next table is "1" (tables A010, A011, A110, A111, C010, C011).

Further, when the head bit of the next table is "0" (tables A000, A001, A100, A101, C000, C001), the table Q in which the table B101 is arranged is selected. Further, the table R in which the table B110 is arranged is selected when the final bit of the preceding table is "1" (tables A001, A011, A101, A111, A201, A211, A301, A311, B001, B011, B101, B111, C000, C010, C100, C110, D000, D010) and the head bit of the next table is "1" (tables A010, A011, A110, A111, C010, C011).

Further, when the head bit of the next table is "0" (tables A000, A001, A100, A101, C000, C001), the table S in which the table B111 is arranged is selected. In other cases, the tables are freely selected.

As for the tables C000, C001, C010 and C011, when the succeeding table is A0, A1 or C0 and the data end with a bit different from the head bit of the next table, the number of continuing bits of "0" or "1" becomes 1 bit. In this case, a table is selected ending with a bit different from the head bit of the next table.

That is, when the head bit of the next table is "1" (tables A010, A011, A110, A111, C010, C011), the table P in which the tables C000 and C010 are arranged is selected. When the head bit of the next table is "0" (tables A000, A001, A100, A101, C000, C001), the table R in which the tables C001 and C011 are arranged is selected. In other cases, the tables are freely selected.

As for the tables C100, C101, C110 and C111, when the preceding table is A0, A1, A2, A3, B0 or B1 and the data start with a bit same as the final bit of the preceding table, the number of continuing bits of "0" or "1" may become a maximum of 14 bits exceeding 8 bits. In this case, the data are selected starting with a bit different from the final bit of the preceding table. When the succeeding table is A0, A1 or C0 and the data end with a bit different from the head bit of the next table, the number of continuing bits of "0" or "1" becomes 1 bit. In this case, a table is selected ending with a bit same as the head bit of the next table.

That is, the table P in which the table C100 is arranged is selected when the final bit of the preceding table is "1" (tables A001, A011, A101, A111, A201, A211, A301, A311, B001, B011, B101, B111) and when the head bit of the next table is "1" (tables A010, A011, A110, A111, C010, C011). When the head bit of the next table is "0" (tables A000, A001, A100, A101, C000, C001), the table Q in which the table C101 is arranged is selected.

Further, when the final bit of the preceding table is "0" (tables A000, A010, A100, A110, A200, A210, A300, A310, B000, B010, B100, B110) and when the head bit of the next table is "1" (tables A010, A011, A110, A111, C010, C011), the table R in which the table C110 is arranged is selected. Further, when the head bit of the next table is "0" (tables A000, A001, A100, A101, C000, C001), the table S in which the table C111 is arranged is selected.

On the other hand, when the preceding table is C0, C1 or D and the data start with a bit different from the final bit of the preceding table, the number of continuing bits of "0" or "1" becomes 1 bit. In this case, the data are selected starting with a bit same as the final bit of the preceding table. Further, when the succeeding table is A0, A1 or C0 and the data end with a bit different from the head bit of the succeeding table, the number of continuing bits of "0" or "1" becomes 1 bit. In this case, a table is selected ending with a bit same as the head bit of the next table.

That is, the table P in which the table C100 is arranged is selected when the final bit of the preceding table is "10" (tables C001, C011, C101, C111, D001, D011) and the head bit of the next table is "1" (tables A010, A011, A110, A111, C010, C011). Further, when the head bit of the next table is "0" (tables A000, A001, A100, A101, C000, C001), the table Q in which the table C101 is arranged is selected.

Further, the table R in which the table C110 is arranged is selected when the final bit of the preceding table is "01" (tables C000, C010, C100, C110, D000, D010) and when the head bit of the next table is "1" (tables A010, A011, A110, A111, C010, C011). When the head bit of the next table is "0" (tables A000, A001, A100, A101, C000, C001), the table S in which the table C111 is arranged is selected. In other cases, the tables are freely selected.

As for the tables D000, D001, D010 and D011, when the preceding table is A0, A1, A2, A3, B0, B1, C0, C1 or D and when the data start with a bit different from the final bit of the preceding table, the number of continuing bits of "0" or "1" becomes 1 bit. In this case, the data are selected starting with a bit same as the final bit of the preceding table. When the succeeding table is A0, A1 or C0 and the data end with a bit different from the head bit of the next table, the number of continuing bits of "0" or "1" becomes 1 bit. In this case, a table is selected ending with a bit same as the head bit of the next table.

That is, the table P in which the table D000 is arranged is selected when the final bit of the preceding table is "0" (tables A000, A010, A100, A110, A200, A210, A300, A310, B000, B010, B100, B110, C001, C011, C101, C111, D001, D011) and when the head bit of the next table is "1" (tables A010, A011, A110, A111, C010, C011). Further, when the head bit of the next table is "0" (tables A000, A001, A100, A101, C000, C001), the table Q in which the table D001 is arranged is selected.

The table R in which the table D010 is arranged is selected when the final bit of the preceding table is "1" (tables A001, A011, A101, A111, A201, A211, A301, A311, B001, B011, B101, B111, C000, C010, C100, C110, D000, D010) and when the head bit of the next table is "1" (tables A010, A011, A110, A111, C010, C011).

When the head bit of the next table is "0" (tables A000, A001, A100, A101, C000, C001), the table S in which the table D011 is arranged is selected. In other cases, the tables are freely selected.

In the foregoing description, even when it may so appear that there is no room for selecting the table, the table can often be freely selected relying upon the preceding and succeeding channel bits. When, for example, the table A0 succeeds the table A1, the table A1 selects a table that ends with a bit different from the head bit of the table A0. On the other hand, it is presumed that A100 in the preceding table A1 is "000011000000110011100000" (tables P, Q) and A101 is "000111110001111001111111" (tables R and S). Then, when A001 in the succeeding table A0 is "001111111001111110001111" (tables P, Q, R, S), the preceding table A1 needs not necessarily select the table A101 but may select the table A100. This is because, even when A101 and A001 are continuing, the number of continuing bits of "0" at the connection portion is 7 bits.

When A101 and A001 are continuing, the number of continuing bits at the connection portion may often become not smaller than 9 bits depending upon the table. In this case as described above, the preceding table A1 must select A100.

The same also holds for other tables. When the number of continuing data bits of the converted data stream inclusive of the connection portion is not smaller than 2 bits but is not larger than k bits, the table is not limited to the one described above but can be freely selected.

Described below is an example of selecting the tables of when it is allowed to freely select the tables. In the tables A1, A3, B1, C0 and C1, it is allowed to freely select the tables in a range in which the number of continuing bits is from 2 to 8, when they are followed by the tables other than the tables A0, A1 and C0. Described below is how to select the table A1.

Here, it is presumed that the time t0:A0 "001111001111000001110000" (tables P, Q, R, S) are followed by time t1:A1 "000011001111000111000000" (tables P, Q), "000111000001100011111111" (tables R, S) and further by time t2:A2 "000000011001100011100011" (tables P, Q) and "111111100110011100 011100" (tables R, S).

Here, the table A1 at the time t1 is followed by the table A2, and either the table P or the table R may be selected. In this case, decreasing the DC component is selected, i.e., decreasing the absolute value of DSV is selected. As for the time t0 and table A0, the number of the bits "1" is 11 and the number of the bits "0" is 13 and, hence, the CDS is "–2". Accordingly, the DSV is set to be "–2" at a start point of time t1.

Next, as for the time t1 and table A1, the CDS is "–6" in the table P and "+2" in the table R. Therefore, the new DSV is "–8" when the table P is selected and is "0" when the table R is selected. In this case, the table R is selected with which the absolute value of the new DSV becomes small, and the DSV is set to "0".

Next, as for the time t2 and table A2, the table R is selected at the time t1 satisfying the condition that the number of the continuing bits is not larger than 8. At the time t2, therefore, the table P must be selected. The CDS in the table P is "–6" and, hence, the DSV at a moment when the time t2 ends is "–6".

Here, when the table P is selected at the time t1, the table R must be necessarily selected at the time t2. On the other hand, when the table R is selected at the time t1, the table P must be selected at the time t2.

When the table A1 is selected as the table P and the table A2 is selected as the table R, the sum of CDS of A1 and A2 is "0". On the other hand, when the table A1 is selected as the table R and the table A2 as the table P, the sum of CDS of the tables A1 and A2 is "–4".

In order to decrease the DSV using the table A1 and the table A2 as a set, therefore, the table A1 may be selected as the table P and the table A2 may be selected as the table R, so that the DSV becomes "–2" at a moment when the table A2 ends.

Figure 6:
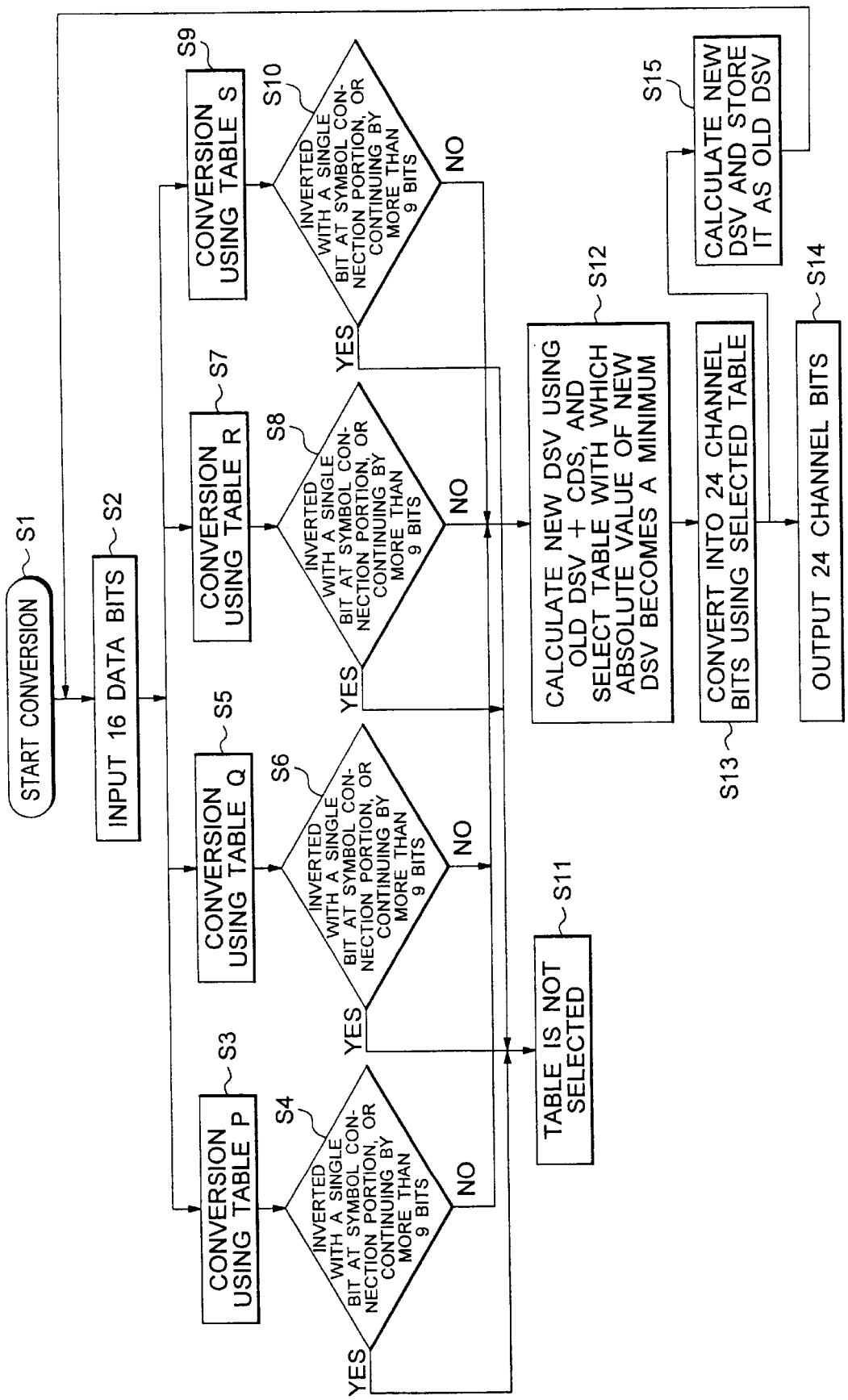
FIG. 6 is a flow chart illustrating the operation for converting the code according to the embodiment of the present invention.

FIG. 6 is a flow chart illustrating the operation for converting the code according to the embodiment of the present invention. The operation for converting the code according to the embodiment of the present invention will now be described with reference to FIG. 6. The processing operation shown in FIG. 6 is realized by executing the processing operation of the code conversion circuit or by executing the program stored in the memory such as ROM.

When the code conversion starts (step S1), 16 data bits are, first, inputted (step S2). At this moment, 24 channel bits are output from the tables P, Q, R and S, respectively, (steps S3, S5, S7 and S9).

Next, it is checked whether there is appearing a stream that inverts by a bit or a stream continuing by not less than 9 bits at the connection portion between the 24 channel bits of one clock before and the 24 channel bits newly output from the tables P, Q, R and S (steps S1, S6, S8 and S10. When there is appearing the stream that inverts by one bit or the stream which is continuing by not less than 9 bits, then, the table is not selected (step S11).

When there is appearing no stream that inverts by one bit or no stream that is continuing by not less than 9 bits, the DSV of 1 clock before and the CDS of the table are added up, and the absolute values of the added results are compared with each other to select a table having the smallest value (step S12).

Finally, the 24 channel bits are output from the table that is selected (steps S13 and S14). At the same time, the new DSV calculated by the selected table is stored for being used as "the DSV value of 1 clock before" in the next clock (step S15). As for the inverse conversion operation, the operation is simply inversed by using an inverse-conversion table and is not, hence, described here in detail.

In the foregoing was described the case where the shortest continuing number of bits was 2, the longest continuing number k of bits was 8, n was 4, and the maximum number of times of code change in the 24 channel bits was 9. However, it is also allowable to change the maximum number of times of changing the code.

FIGS. 7 and 8 are diagrams illustrating other tables for converting 16 data bits into 24 channel bits. In FIGS. 7 and 8, the maximum number of times of changing the code is 10.

Considered below are the combinations of data satisfying the following conditions among the 16777216 patterns. A first condition is that the same bits necessarily continue by not less than 2 bits except in the head portion and in the last portion of the table. A second condition is that the same bits necessarily continue by not more than 8 bits except in the head portion and in the last portion of the table, and the same bits continue by not more than 7 bits in the head portion and in the last portion of the table. A third condition is that when the 24 bits are successively arranged, a point where "0" changes into "1" or "1" changes into "0" appears not more than 10 times. The combinations of data satisfying these first to third conditions include 122016 patterns.

The above 122016 patterns are classified into the tables A0, A1, A2, A3, B0, B1, C0, C1 and D as described earlier. Characteristics of these tables A0, A1, A2, A3, B0, B1, C0, C1 and D are the same as those of when the code is converted a maximum number of 9 times.

Tables A000, A001, A010 and A011 include 7359, 7341, 7341 and 7359 patterns, respectively. Tables A100, A101 and tables A110, A111 correspond to the same 16 data bits, and include 1782 and 1782 patterns, respectively.

Tables A200, A211 and tables A201, A210 correspond to the same 16 data bits, and include 1782 and 1798 patterns, respectively. Tables A300, A301, A310 and A311 correspond to the same 16 data bits, and include 432 patterns, respectively.

Tables B000, B011 and tables B001, B010 correspond to the same 16 data bits, and include 5841 and 5834 patterns, respectively. Tables B100, B101, B110 and B111 correspond to the same 16 data bits, and include 1421 patterns, respectively.

Tables C000, C001 and tables C010, C011 correspond to the same 16 data bits, and include 5834 and 5834 patterns, respectively. Tables C100, C101, C110 and C111 correspond to the same 16 data bits, and include 1421 patterns, respectively.

Tables D000, D001, D010 and D011 correspond to the same 16 data bits, and include 4589 patterns, respectively. There are a total of 67750 patterns, which is larger than a minimum required value of 65536 patterns. Among the above 67750 patterns, therefore, 65536 patterns are used, but the remaining 2214 patterns are not used but are held.

Thus, the maximum number of times of code conversion may be 9, 10, not larger than 8 or not less than 11. In FIGS. 4 and 5, 66356 patterns are used, but the remaining 1000 patterns are not used but are held. However, these 1000 patterns can be effectively used.

FIG. 9 is a diagram illustrating a further table for converting 16 data bits into 24 channel bits. FIG. 9 illustrates only the tables A0, A1, A2 and A3. For the tables B0, B1, C0, C1 and D, reference should be made to FIG. 4.

The tables A000, A001, A002 and A003 include 29268 patterns, and have one kind of pattern for the 16 data bits. From them are picked up 1000 patterns in which the CDS increases in the – (minus) direction and 1000 patterns in which the CDS increases in the + (plus) direction. The patterns increasing in the –direction are arranged in the tables P and Q, and the patterns increasing in the +direction are arranged in the tables R and S corresponding to the same 16 data bits. This portion is regarded as a Table AS.

For example, a pattern "000011000001100000110000" increasing in the –direction is arranged in the tables P and Q, and a pattern "111100111110011111 001111" increasing in the +direction is arranged in the tables R and S.

The tables P, Q/tables R, S of these portions can be freely selected irrespective of the preceding and succeeding channel bits and, hence, a table for decreasing the DSV is selected. Thus, the DSV can be efficiently decreased.

In FIGS. 7 and 8, further, 67750 patterns are used, but the remaining 2214 patterns are not used and are held. However, these 2214 patterns can be effectively used.

FIG. 10 is a diagram illustrating a further table for converting 16 data bits into 24 channel bits. FIG. 10 illustrates the tables A0, A1, A2 and A3 only. For the tables B0, B1, C0, C1 and D, reference should be made to FIG. 8.

The tables A000, A001, A002 and A003 include 29400 patterns, and have one kind of pattern for the 16 data bits. From them are picked up 2214 patterns in which the CDS increases in the –direction and 2214 patterns in which the CDS increases in the +direction. The patterns increasing in the –direction are arranged in the tables P and Q, and the patterns increasing in the +direction are arranged in the tables R and S corresponding to the same 16 data bits. This portion is regarded as the table AS.

For example, a pattern "001100000000110000000011" increasing in the direction is arranged in the tables P and Q, and a pattern "1100111111110011 11111100" increasing in the +direction is arranged in the tables R and S.

The tables P, Q/tables R, S of these portions can be freely selected irrespective of the preceding and succeeding channel bits and, hence, a table for decreasing the DSV is selected. Thus, the DSV can be efficiently decreased.

In the above-mentioned case, the table AS is prepared from the tables A000, A001, A010 and A011. However, the table AS may be prepared from the tables A1, A2 and A3 or from the tables B, C and D. Or, these tables may be combined together. Among 1000 patterns, for example, 300 patterns may be prepared and combined from the table A0, 250 patterns may be prepared and combined from the table A1, 250 patterns may be prepared and combined from the table A2, and 200 patterns may be prepared and combined from the table B0.

For example, the patterns are prepared from the tables A100 and A101 in a manner as described below.

The table A100 having the CDS increasing in the –direction is arranged in the table P, and the table A100 having the CDS increasing in the +direction is arranged in the table Q. On the other hand, the table A101 having the CDS increasing in the –direction is arranged in the table R, and the table A101 having the CDS increasing in the +direction is arranged in the table S. It is attempted to obtain the following relationships.

Table P: "000011000011000001100000"

CDS: –12

Table Q: "001111111100111111100000"

CDS: +6

Table R: "000011000011000000011111"

CDS: –6

Table S: "001111111100111110011111"

CDS: +12

Concerning other tables A110, A111, A200 to A211, B000 to B011, C000 to C011, too, the data having the CDS increasing in the –direction are arranged in the tables P and R, and the data having the CDS increasing in the +direction are arranged in the tables Q and S.

Even when the four patterns have been used already in the tables P, Q, R and S as in the tables A300 to A311, the table AS can be prepared by further increasing the tables.

In this case, A300 having the CDS increasing in the –direction is arranged in the table P0, and A300 having the CDS increasing in the +direction is arranged in the table P1. Further, A301 having the CDS increasing in the −direction is arranged in the table Q0, A301 having the CDS increasing in the +direction is arranged in the table Q1, A310 having the CDS increasing in the −direction is arranged in the table R0, A310 having the CDS increasing in the +direction is arranged in the table R1, A311 having the CDS increasing in the −direction is arranged in the table S0, and A311 having the CDS increasing in the +direction is arranged in the table S1. It is attempted to obtain the following relationships.

Table P0: "000000011000000110000000"
CDS: −16
Table P1: "000001111110011111100000"
CDS: 0
Table Q0: "000001100000110000011111"
CDS: −6
Table Q1: "000000011111111001111111"
CDS: +6
Table R0: "111110000011000001100000"
CDS: −6
Table R1: "111111100111111110000000"
CDS: +6
Table S0: "111110000001100000011111"
CDS: 0
Table S1: "111111100111111001111111"
CDS: +16

Here, the tables P1 and S0 both have the CDS:0. This is because, only this value is obtained despite the codes close to the conditions are selected. Concerning other tables B100 to B111, C100 to C111 and D000 to D011, too, the data having the CDS increasing in the −direction are arranged in the tables P0, Q0, R0 and S0, and the data having the CDS increasing in the +direction are arranged in the tables P1, Q1, R1 and S1. An optimum table is selected out of these eight tables.

Due to the deviation, the PLL may be often deviating at the delimitation of conversion. To restore this, a synchronization signal is inserted in the stream at regular intervals. The synchronization signals are selected from the combinations of tables P, Q, R and S of 1000 patterns that are not used in FIGS. 4 and 5. Or, the synchronization signals are selected from the combinations of the tables P, Q, R and S of 2214 patterns that are not used in FIGS. 7 and 8. This holds even when the synchronization signals are of a single kind or of a plurality of kinds.

Even in a pair of FIGS. 9 and 5, the synchronization signals are selected from the combinations of the tables P, Q, R and S. In this case, the number of patterns of the table AS is decreased by one every time when the synchronization signals are selected in two patterns.

In a pair of FIGS. 10 and 8, too, the synchronization signals are selected from the combinations of the tables P, Q, R and S. In this case, too, the number of patterns of the table AS is decreased by one every time when the synchronization signals are selected in two patterns.

As described above, what is important in preparing the table is that the combinations of the 24 channel bits are as described below.
(1) The same bits continue by not less than 2 bits but not more than k bits except in the head portion and in the last portion of 24 bits.
(2) The same bits continue by not less than 1 bits but not more than (k−1) bits in the head portion and in the last portion of 24 bits.
(3) The total number of data in which the continuing bits are 2 bits, is not larger than i bits among the 24 bits. In addition to these:
(4) Tables A000, A001, A010 and A011 are in common among the tables P, Q, R and S.
(5) Tables A100 and A101 are arranged in a pair, and tables A110 and A111 are arranged in a pair for the same 16 data bits.
(6) Tables A200, A201 and A211, A210 are arranged in pairs for the same 16 data bits.
(7) Tables A300, A301 and A310, A311 are arranged in pairs for the same 16 data bits.
(8) Tables B000, B001 and B011, B010 are arranged in pairs for the same 16 data bits.
(9) Tables B100, B101 and B110, B111 are arranged in pairs for the same 16 data bits.
(10) Tables C000, C001 and C010, C011 are arranged in pairs for the same 16 data bits.
(11) Tables C100, C101 and C110, C111 are arranged in pairs for the same 16 data bits.
(12) Tables D000, D001 and D010, D011 are arranged in pairs for the same 16 data bits.

Further, the rules should be obeyed such that when the total number of patterns of the 24 channel bits exceed 65536 patterns, an excess of the patterns can be arranged being overlapped in the tables P, Q, R and S, and that the tables P, Q, R and S can be freely selected unless the above conditions are not violated.

So far as the above rules are obeyed, therefore, the tables P, Q, R and S may be replaced, or the tables A, B, C and D may be replaced up and down.

Not being limited to the examples shown in FIGS. 4 and 5, and FIGS. 7 to 10, further, the data may be replaced in a random fashion in both the direction of the tables P, Q, R and S and the direction of the tables A, B, C and D.

Further, when the tables P, Q, R and S can be freely selected, a table which decreases the DSV is selected. The table, however, may be selected by any other method. In a recording/reproducing system in which the PLL is stabilized by increasing the number of times of inversion, for example, the table is so selected as to increase the number of times of inversion.

Concerning the table AS in which those patterns exceeding 65536 are arranged in an overlapped manner, further, a table for decreasing the DSV is selected. The table, however, may be selected according to any other method. In a recording/reproducing system in which the PLL is stabilized by increasing the number of times of inversion, for example, the table is so selected as to increase the number of times of inversion.

As for the condition that the total number of data in which the continuing bits are 2 bits is not larger than i bits in the 24 bits, the condition may be such that the total number of data in which different bits are neighboring is not larger than j bits, or these conditions may be combined together.

So far as the above rules are obeyed, further, a maximum number k of continuing bits, i.e., Tmax, may be a value other than 8, and n may be a value other than 4.

As described above, the invention is concerned with the channel coding system which converts 16 data bits into 24 channel bits to record the data in the form of NRZ in an optical disk device or in the like device. In this channel coding system, the number of continuing bits of the same code is from 2 to 8 bits to exhibit the same characteristics as the (1.7) code, enabling the PLL to be stably locked. Accordingly, the total number of data in which the continuing bits are 2 bits is selected to be not larger than i bits in the 24 bits, an optimum table is selected out of four kinds of tables so that Tmin=1.33T, Tmax=5.33T, Twin=0.67T, thereby to decrease the DC component as much as possible.

What is claimed is:

1. A channel code converter including table means storing the combinations of channel bits of a bit number larger than a predetermined bit number assigned from the combinations of data bits of said predetermined bit number, in order to convert the codes of data bits of said predetermined bit number into said channel bits using said table means and to record the data according to an NRZ (non-return to zero) rule, wherein said table means comprises:

a first table for storing the data satisfying predetermined conditions, the data satisfying predetermined conditions being those data having a pattern in which the same bits are continuing by not less than 2 bits in the head portion and in the last portion among the patterns in which the same bits are necessarily continuing by not less than 2 bits except in the head portion and in the last portion of the data stored in the table means among the channel bits, the same bits are necessarily continuing by not more than k bits (k is a positive integer) except in the head portion and in the last portion, and the same bits are continuing by not more than (k−1) bits in the head portion and in the last portion;

a second table for storing the data of a pattern in which the head portion starts with either "01" or "10" and the same bits are continuing by not less than 2 bits in the last portion among the patterns in which the bits are continuing by not more than (k−1) bits;

a third table for storing the data in which the same bits are continuing by not less than 2 bits in the head portion, and the last portion ends with "01" and "10" among the patterns in which the bits are continuing by not more than (k−1) bits; and a fourth table for storing the data of a pattern in which the head portion starts with either "01" or "10" and the last portion ends with either "01" or "10" among the patterns in which the bits are continuing by not more than (k−1) bits;

said channel code converter further including:

selection means for selecting any one of said first table to said fourth table so as to start with a channel bit data same as the final bit of one channel bit before and so as to end with a channel bit data same as the start bit of one channel bit after, so that the continuing data bits of a data stream converted inclusive of a connection portion between said channel bits are not smaller than 2 bits but are not larger than k bits.

2. A channel code converter according to claim 1, wherein:

said second table is a table of a combination of a pattern starting with "01" and a pattern starting with "10";

said third table is a table of a combination of a pattern ending with "01" and a pattern ending with "10"; and said fourth table is a table of a combination of a pattern starting with "01" and ending with "01", a pattern starting with "01" and ending with "10", a paten starting with "10" and ending with "01", and a pattern staring with "10" and ending with "10"; and concerning said second table, a table is so selected as to start with a channel bit data same as the final bit of one channel bit before; and concerning said third table, a table is so selected as to end with a channel bit data same as the start bit of one channel bit after.

3. A channel code converter according to claim 1, wherein:

said first table comprises a fifth table for storing the data in which said continuing data bits are not larger than n bits (n is a positive integer) in both the head portion and the last portion, a sixth table for storing the data in which said continuing data bits are not larger than n bits in the head portion and are from (n+1) to (k−1) bits in the last portion, a seventh table for storing the data in which said continuing data bits are from (n+1) to (k−1) bits in the head portion and are not larger than n bits in the last portion, and an eighth table for storing the data in which said continuing data bits are from (n+1) to (k−1) bits in both the head portion and the last portion;

said second table comprises a ninth table for storing the data in which said continuing data bits are not larger than n bits in the last portion, and a tenth table for storing the data in which said continuing data bits are from (n+1) to (k−1) bits in the last portion;

said third table comprises an eleventh table for storing the data in which said continuing data bits are not larger than n bits in the head portion, and a twelfth table for storing the data in which said continuing data bits are from (n+1) to (k−1) bits in the head portion;

said fifth table arranges data in a table;

said sixth table arranges two data in a table, said two data having the head portions starting with the same data and having the last portions ending with "0" and "1";

said seventh table arranges two data in a table, said two data having the head portions starting with "0" and "1";

said eighth table arranges four data in a table, said four data being so combined that the head portions start with "0" and "1" and the last portions end with "0" and "1";

said ninth table arranges two data in a table, said two data having head portions starting with "0" and "1";

said tenth table arranges four data in a table, said four data being so combined that the head portions start with "0" and "1" and the last portions end with "0" and "1";

said eleventh table arranges two data in a table, said two data having head portions starting with the same data and having the last portions ending with "0" and "1";

said twelfth table arranges four data in a table, said four data being so combined that the head portions start with "0" and "1" and the last portions end with "0" and "1"; and said fourth table arranges four data in a table, said four data being so combined that the head portions start with "0" and "1" and the last portions end with "0" and "1".

4. A channel code converter according to claim 3, wherein, said tables are so selected that:

concerning said fifth table, the data are converted for data in a table;

concerning said sixth table, the data are selected that end with a bit different from the head bit of a next table when the succeeding table is any one of said fifth table, said sixth table or said eleventh table, and the data are arbitrarily selected in other cases;

concerning said seventh table, the data are selected that start with a bit different from the final bit of the preceding table when the preceding table is any one of said fifth table to said tenth table, and the data are selected that start with a bit same as the final bit of the preceding table when the preceding table is any one of said eleventh table, said twelfth table or said fourth table;

concerning said eighth table, the data are selected that start with a bit different from the final bit of the preceding table when the preceding table is any one of said fifth table to said tenth table, the data are selected that start with a bit same as the final bit of the preceding table when the preceding table is any one of said eleventh table, said twelfth table or said fourth table, the data are selected that end with a bit different from the head bit of a next table when the next table is any one of said fifth table, said sixth table or said eleventh table, and any data are selected in other cases;

concerning said ninth table, the data are selected that start with a bit same as the final bit of the preceding table when the preceding table is any one of said fourth table to said twelfth table;

concerning said tenth table, the data are selected that start with a bit same as the final bit of the preceding table when the preceding table is any one of said fourth table to said twelfth table, selects the data that end with a bit different from the head bit of the next table when the next table is any one of said fifth table, said sixth table or said eleventh table, and any data are selected in other cases;

concerning said eleventh table, the data are selected ending with a bit same as the head bit of the next table when the next table is any one of said fifth table, said sixth table or said eleventh table, and any data are selected in other cases;

concerning said twelfth table, the data are selected that start with a bit different from the final bit of the preceding table when the preceding table is any one of said fifth table to said tenth table, the data are selected starting from a bit same as the final bit of the preceding table when the preceding table is any one of said eleventh table, said twelfth table or said fourth table, the data are selected ending with a bit same as the head bit of the next table when the next table is any one of said fifth table, said sixth table or said eleventh table, and any data are selected in other cases; and concerning said fourth table, the data are selected starting with a bit same as the final bit of the preceding table when the preceding table is any one of said fourth table to said twelfth table, the data are selected ending with a bit same as the head bit of the next table when the next table is any one of said fifth table, said sixth table or said eleventh table, and any data are selected in other cases.

5. A channel code converter according to claim 4, wherein in arbitrarily selecting the table, the data that minimize the DC component are selected.

6. A channel code converter according to claim 1, wherein said value k is set to 8.

7. A channel code converter according to claim 3, wherein said value n is set to 4.

8. A channel code converter according to claim 1, wherein the total number of data is minimized in which the continuing bits are 2 bits among said channel bits.

9. A channel code converter according to claim 1, wherein the total number of data is minimized in which the neighboring bits are different among said channel bits.

10. A channel code converter according to claim 1, wherein said data bits comprise 16 bits and have combinations of 65536 patterns, and said channel bits comprise 24 bits and have combinations of 16777216 patterns.

11. A channel code converter according to claim 1, wherein when the combinations exist in an amount larger than 65536 patterns, said first to said fourth tables use the 65536 patterns among them as tables.

12. A channel code converter according to claim 1, wherein when the combinations exist in an amount larger than 65536 patterns, said first to said fourth tables specify, in an overlapped manner, those table data over the 65536 patterns.

13. A channel code converter according to claim 12, wherein the table data specified in an overlapped manner are selected in order of increasing DC component, and channel bits having large positive DC components and channel bits having large negative DC components are arranged in combination in the same table.

14. A channel code converter according to claim 1, wherein any single pattern, or a combination of two patterns or a plurality of patterns in said first to fourth tables are used as synchronization signals, and said patterns are excluded from the tables and are not used as data.

15. A channel coding system including table means storing the combinations of channel bits of a bit number larger than a predetermined bit number assigned from the combinations of data bits of said predetermined bit number, in order to convert the codes of data bits of said predetermined bit number into said channel bits using said table means and to record the data according to an NRZ (non-return to zero) rule, wherein said table means comprises:

a first table for storing the data satisfying predetermined conditions, the data satisfying the predetermined conditions being those data having a pattern in which the same bits are continuing by not less than 2 bits in the head portion and in the last portion among the patterns in which the same bits are necessarily continuing by not less than 2 bits except in the head portion and in the last portion of the data stored in the table unit among the channel bits, the same bits are necessarily continuing by not more than k bits (k is a positive integer) except in the head portion and in the last portion, and the same bits are continuing by not more than (k−1) bits in the head portion and in the last portion;

a second table for storing the data of a pattern in which the head portion starts with either "01" or "10" and the same bits are continuing by not less than 2 bits in the last portion among the patterns in which the bits are continuing by not more than (k−1) bits;

a third table for storing the data in which the same bits are continuing by not less than 2 bits in the head portion and the last portion ends with "01" and "10" among the patterns in which the bits are continuing by not more than (k−1) bits; and a fourth table for storing the data of a pattern in which the head portion starts with either "01" or "10" and the last portion ends with either "01" or "10" among the patterns in which the bits are continuing by not more than (k−1) bits;

and further including:

a selection step for selecting any one of said first table to said fourth table so as to start with a channel bit data same as the final bit of one channel bit before and so as to end with a channel bit data same as the start bit of one channel bit after, so that the continuing data bits of a data stream converted inclusive of a connection portion between said channel bits are not smaller than 2 bits but are not larger than k bits.

16. A channel coding system according to claim 15, wherein:

said second table is a table of a combination of a pattern starting with "01" and a pattern starting with "10";

said third table is a table of a combination of a pattern ending with "01" and a pattern ending with "10"; and said fourth table is a table of a combination of a pattern starting with "01" and ending with "01", a pattern starting with "01" and ending with "10", a pattern starting with "10" and ending with "01", and a pattern staring with "10" and ending with "10"; and concerning said second table, a table is so selected as to start with a channel bit data same as the final bit of one channel bit before; and concerning said third table, a table is so selected as to end with a channel bit data same as the start bit of one channel bit after.

17. A channel coding system according to claim 15, wherein:

said first table comprises a fifth table for storing the data in which said continuing data bits are not larger than n bits (n is a positive integer) in both the head portion and the last portion, a sixth table for storing the data in which said continuing data bits are not larger than n bits in the head portion and are from (n+1) to (k−1) bits in the last portion, a seventh table for storing the data in which said continuing data bits are from (n+1) to (k−1) bits in the head portion and are not larger than n bits in the last portion, and an eighth table for storing the data in which said continuing data bits are from (n+1) to (k−1) bits in both the head portion and the last portion;

said second table comprises a ninth table for storing the data in which said continuing data bits are not larger than n bits in the last portion, and a tenth table for storing the data in which said continuing data bits are from (n+1) to (k−1) bits in the last portion;

said third table comprises an eleventh table for storing the data in which said continuing data bits are not larger than n bits in the head portion, and a twelfth table for storing the data in which said continuing data bits are from (n+1) to (k−1) bits in the head portion;

said fifth table arranges data in a table;

said sixth table arranges two data in a table, said two data having the head portions starting with the same data and having the last portions ending with "0" and "1";

said seventh table arranges two data in a table, said two data having the head portions starting with "0" and "1";

said eighth table arranges four data in a table, said four data being so combined that the head portions start with "0" and "1" and the last portions end with "0" and "1";

said ninth table arranges two data in a table, said two data having head portions starting with "0" and "1";

said tenth table arranges four data in a table, said four data being so combined that the head portions start with "0" and "1" and the last portions end with "0" and "1";

said eleventh table arranges two data in a table, said two data having head portions starting with the same data and having the last portions ending with "0" and "1";

said twelfth table arranges four data in a table, said four data being so combined that the head portions start with "0" and "1" and the last portions end with "0" and "1"; and said fourth table arranges four data in a table, said four data being so combined that the head portions start with "0" and "1" and the last portions end with "0" and "1".

18. A channel coding system according to claim 17, wherein, said tables are so selected that:

concerning said fifth table, the data are converted for data in a table;

concerning said sixth table, the data are selected that end with a bit different from the head bit of a next table when the succeeding table is any one of said fifth table, said sixth table or said eleventh table, and the data are arbitrarily selected in other cases;

concerning said seventh table, the data are selected that start with a bit different from the final bit of the preceding table when the preceding table is any one of said fifth table to said tenth table, and the data are selected that start with a bit same as the final bit of the preceding table when the preceding table is any one of said eleventh table, said twelfth table or said fourth table;

concerning said eighth table, the data are selected that start with a bit different from the final bit of the preceding table when the preceding table is any one of said fifth table to said tenth table, the data are selected that start with a bit same as the final bit of the preceding table when the preceding table is any one of said eleventh table, said twelfth table or said fourth table, the data are selected that end with a bit different from the head bit of a next table when the next table is any one of said fifth table, said sixth table and said eleventh table, and any data are selected in other cases;

concerning said ninth table, the data are selected that start with a bit same as the final bit of the preceding table when the preceding table is any one of said fourth table to said twelfth table;

concerning said tenth table, the data are selected that start with a bit same as the final bit of the preceding table when the preceding table is any one of said fourth table to said twelfth table, the data are selected that end with a bit different from the head bit of the next table when the next table is any one of said fifth table, said sixth table or said eleventh table, and any data are selected in other cases;

concerning said eleventh table, the data are selected ending with a bit same as the head bit of the next table when the next table is any one of said fifth table, said sixth table or said eleventh table, and any data are selected in other cases;

concerning said twelfth table, the data are selected that start with a bit different from the final bit of the preceding table when the preceding table is any one of said fifth table to said tenth table, the data are selected starting from a bit same as the final bit of the preceding table when the preceding table is any one of said eleventh table, said twelfth table or said fourth table, the data are selected ending with a bit same as the head bit of the next table when the next table is any one of said fifth table, said sixth table or said eleventh table, and any data are selected in other cases; and concerning said fourth table, the data are selected starting with a bit same as the final bit of the preceding table when the preceding table is any one of said fourth table to said twelfth table, the data are selected ending with a bit same as the head bit of the next table when the next table is any one of said fifth table, in said sixth table or said eleventh table, and any data are selected in other cases.

19. A channel coding system according to claim 18, wherein in arbitrarily selecting the table, the data that minimize the DC component are selected.

20. A channel coding system according to claim 15, wherein said value k is set to 8.

21. A channel coding system according to claim 17, wherein said value n is set to 4.

22. A channel coding system according to claim 15, wherein the total number of data is minimized in which the continuing bits are 2 bits among said channel bits.

23. A channel coding system according to claim 15, wherein the total number of data is minimized in which the neighboring bits are different among said channel bits.

24. A channel coding system according to claim 15, wherein said data bits comprise 16 bits and have combinations of 65536 patterns, and said channel bits comprise 24 bits and have combinations of 16777216 patterns.

25. A channel coding system according to claim 15, wherein when the combinations exist in an amount larger than 65536 patterns, said first to said fourth tables use the 65536 patterns among them as tables.

26. A channel coding system according to claim 15, wherein when the combinations exist in an amount larger than 65536 patterns, said first to said fourth tables specify, in an overlapped manner, those table data over the 65536 patterns.

27. A channel coding system according to claim 26, wherein the table data specified in an overlapped manner are selected in order of increasing DC component, and channel bits having large positive DC components and channel bits having large negative DC components are arranged in combination in the same table.

28. A channel coding system according to claim 15, wherein any single pattern, or a combination of two patterns or a plurality of patterns in said first to fourth tables are used as synchronization signals, and said patterns are excluded from the tables and are not used as data.

29. A recording medium adapted to a channel code converter including table means storing the combinations of channel bits of a bit number larger than a predetermined bit number assigned from the combinations of data bits of said predetermined bit number, said recording medium recording a control program which enables said channel code converter to convert the codes of data bits of said predetermined bit number into said channel bits using said table means and to record the data according to an NRZ (non-return to zero) rule, wherein said table comprises:

a first table for storing the data satisfying predetermined conditions, the data satisfying the predetermined conditions being those data having a pattern in which the same bits are continuing by not less than 2 bits in the head portion and in the last portion among the patterns in which the same bits are necessarily continuing by not less than 2 bits except in the head portion and in the last portion of the data stored in the table means among the channel bits, the same bits are necessarily continuing by not more than k bits (k is a positive integer) except in the head portion and in the last portion, and the same bits are continuing by not more than (k−1) bits in the head portion and in the last portion;

a second table for storing the data of a pattern in which the head portion starts with either "01" or "10" and the same bits are continuing by not less than 2 bits in the last portion among the patterns in which the bits are continuing by not more than (k−1) bits;

a third table for storing the data in which the same bits are continuing by not less than 2 bits in the head portion and the last portion ends with "01" and "10" among the patterns in which the bits are continuing by not more than (k−1) bits; and a fourth table for storing the data of a pattern in which the head portion starts with either "01" or "10" and the last portion ends with either "01" or "10" among the patterns in which the bits are continuing by not more than (k−1) bits;

wherein said control program enables said channel code converter to select any one of said first table to said fourth table so as to start with channel bit data same as the final bit of one channel bit before and so as to end with channel bit data same as the start bit of one channel bit after, so that the continuing data bits of a data stream converted inclusive of a connection portion between said channel bits are not smaller than 2 bits but are not larger than k bits.

* * * * *